(12) United States Patent
Phillips

(10) Patent No.: US 12,013,059 B2
(45) Date of Patent: Jun. 18, 2024

(54) PIPE CONNECTION CLAMP

(71) Applicant: C. Allen Phillips, Rising Star, TX (US)

(72) Inventor: C. Allen Phillips, Rising Star, TX (US)

( * ) Notice: Subject to any disclaimer, the term of this patent is extended or adjusted under 35 U.S.C. 154(b) by 33 days.

(21) Appl. No.: 18/055,152

(22) Filed: Nov. 14, 2022

(65) Prior Publication Data

US 2024/0159334 A1 May 16, 2024

(51) Int. Cl.
*F16L 21/06* (2006.01)
*F16L 21/00* (2006.01)

(52) U.S. Cl.
CPC ............ *F16L 21/06* (2013.01); *F16L 21/002* (2013.01)

(58) Field of Classification Search
CPC ....... F16L 21/002; F16L 21/06; F16L 21/065; F16L 15/08; F16L 23/003; F16L 23/006; F16L 25/06; F16L 25/04; F16L 19/005; E21B 17/043; E21B 17/046; E21B 19/16
USPC .......................................................... 285/92
See application file for complete search history.

(56) References Cited

U.S. PATENT DOCUMENTS

| | | | |
|---|---|---|---|
| 2,393,795 A * | 1/1946 | Miller | B25B 27/16 29/238 |
| 3,180,659 A * | 4/1965 | Vigneron | F16L 15/008 285/332 |
| 3,830,527 A * | 8/1974 | Naifeh | F16L 25/0018 285/31 |
| 4,640,531 A * | 2/1987 | Forster | G21F 7/06 285/93 |
| 5,090,742 A * | 2/1992 | Cohen | F16L 21/08 285/373 |
| 5,222,768 A * | 6/1993 | Hofer | F16L 19/005 285/39 |
| 5,312,139 A * | 5/1994 | Marks | F16L 19/005 285/39 |
| 6,139,068 A * | 10/2000 | Burress | F16L 19/005 285/92 |
| 10,228,011 B1 * | 3/2019 | Anwar | F16B 41/005 |
| 10,781,948 B1 * | 9/2020 | Gregory | F16L 23/032 |
| 11,306,856 B2 * | 4/2022 | Routon | F16L 47/32 |
| 2012/0193910 A1 * | 8/2012 | Vice | F16L 23/006 285/408 |
| 2017/0167203 A1 * | 6/2017 | Bowley | F16L 15/001 |
| 2018/0058614 A1 * | 3/2018 | Anderson | F16L 21/06 |
| 2018/0195652 A1 * | 7/2018 | Bradberry | F16L 21/08 |
| 2019/0219213 A1 * | 7/2019 | Tuck | F16L 21/065 |
| 2020/0048969 A1 * | 2/2020 | Aas | F16B 7/0413 |
| 2021/0172268 A1 * | 6/2021 | Westgarth | F16L 21/06 |
| 2022/0107036 A1 * | 4/2022 | Al-Otaibi | F16K 3/10 |
| 2022/0403961 A1 * | 12/2022 | Andronaco | F16L 23/003 |

* cited by examiner

*Primary Examiner* — Aaron M Dunwoody
(74) *Attorney, Agent, or Firm* — James G. Passe; Passe Intellectual Property, LLC

(57) ABSTRACT

A device for keeping connected pipe ends from loosening or separating, especially if they are of different diameters, wherein there is a four-piece clamp consisting of four identical semicircular pieces that when joined together creates a set of circular pieces. The set of circular pieces interlock at the ends of a pipe creating a four-piece clamp.

1 Claim, 7 Drawing Sheets

PIPE CONNECTION CLAMP

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a device for keeping the ends of two cylindrical pipes (hollow or solid) from loosening or separating, especially if they are of different diameters.

Description of Related Art

The need for holding connected pipes together and strengthening the connection is necessary to reinforce two pipe connections from loosening or separating (e.g., a quill connected to a CRT (casing running tool) used in the oil drilling industry). However, when the ends of each piece of pipe are connected (e.g., by screwing together), the connection of the pipes can loosen, and when the ends of each piece of pipeline pipe are of a different diameter, the ends of the pipes are much more difficult to connect, if not otherwise impossible in some circumstances.

There have been attempts to make clamps that serve the purpose of preventing two pipes from loosening or separating, especially if they are of different diameters. However, these clamps require twelve or more bolts to hold the ends of the pipes together. There is also a system, which leads to failure during use because the clamps do not fit well together.

BRIEF SUMMARY OF THE INVENTION

The present invention relates to a pipe clamp that solves the current issues with keeping connected pipes from loosening or separating, especially if they are of different diameters. Specifically, the present invention relates to a four-piece clamping device that comprises four semicircular pieces, wherein a first circular clamp consists of two semicircular pieces that are bolted together at a first pipe end creating a first circular clamp on a first pipe end, and two additional semicircular pieces of a second circular clamp that are bolted together at a second pipe end creating a second circular clamp on a second pipe end. The first circular clamp that is bolted together at a first pipe end interlocks with a second circular clamp that is bolted together at a second pipe end. The interlock is accomplished by a projection on each end of the semicircular clamp piece so that when two semicircular pieces are bolted together by using a total of four bolts, they form a larger projection. The projections fit into each of the other pipe clamp depressions to create a tough, tight bond that resists torque and prevents the pipe connection from loosening or separating. The resulting circular clamp is stronger than any previous attempts to join two pipe ends together with or without having the same diameter.

Accordingly, in one embodiment, there is a four-piece clamping device for keeping connected pipe ends from loosening or separating comprising:
  a) a set of a first and second semicircular clamp pieces that when joined together by bolts creates a first and second circular clamp piece, wherein a first and second circular clamp creates a four-piece clamping device;
  b) wherein each of the four-piece clamps are identical and comprise a semicircular shape, wherein each set of two semicircular clamps bolt together with four bolts to produce a first and second circular clamp piece;
  c) wherein each semicircular clamp piece has a projection on each end of the semicircular clamp piece, such that when two semicircular clamp pieces are bolted together to form a circular clamp piece, the projections of each semicircular clamp piece meet to form two larger projections which creates a depression between the two larger projections; and
  d) wherein the first and second circular clamp pieces fit together by the projections of the first circular clamp piece fitting into the depression of the second circular clamp piece, and the projections of the second circular clamp piece fitting into the depression of the first circular clamp piece to form a single clamp.

DETAILED DESCRIPTION OF THE INVENTION

Figure 1:
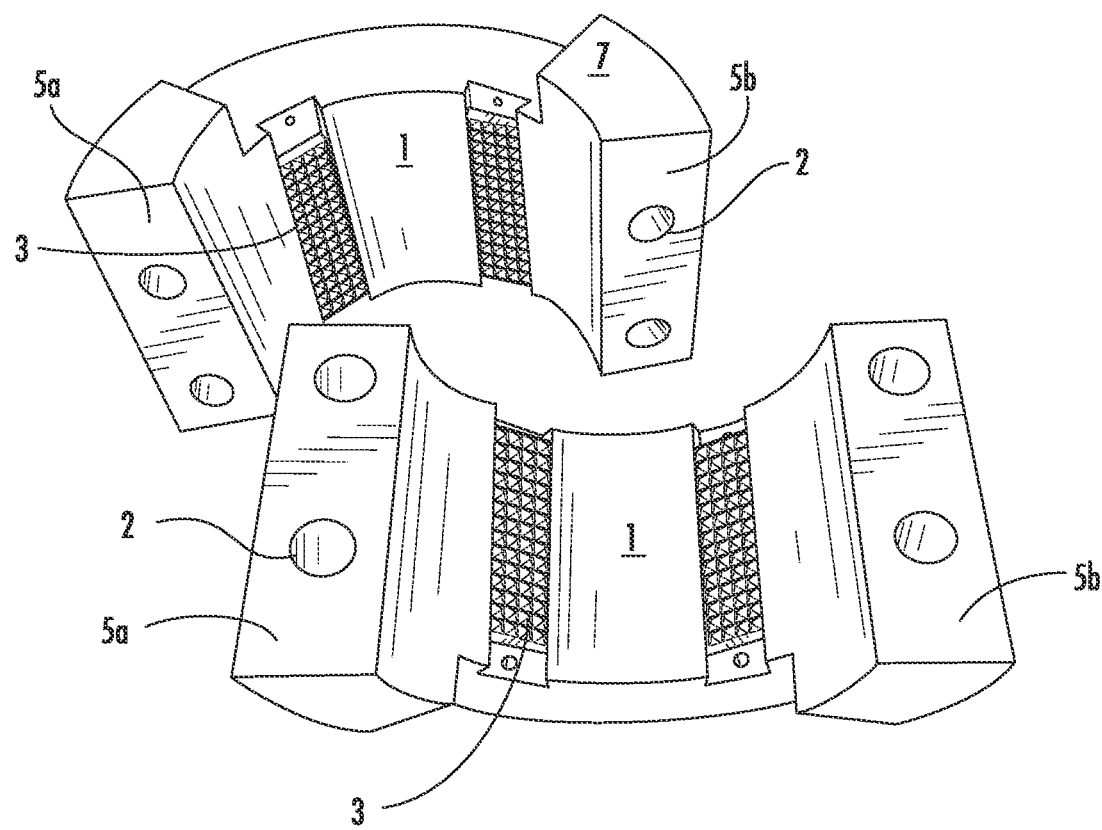
FIG. 1 is a perspective view of two of the four pieces of the clamping device of the present invention.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "four-piece clamping device" refers to the device comprising four identical semicircular pieces, which when two semicircular pieces are joined together, one cylindrical/circular clamp is created (four semicircular pieces create two cylindrical/circular clamps); one for each pipe end, and when interlocked, they keep two connected pipe ends (e.g., screwed together, bolted together, or the like) from loosening or separating. Each pair of circular clamps/pieces bolt together with four bolts (two on each side), though other numbers are contemplated. The two bolted together circular clamps/pieces then interlock with one another at the top and bottom of the circular clamps/pieces with two additional bolted together pieces (as seen in the Figures) forming a cylindrical/circular clamp, consisting of a first clamp and a second clamp. The two bolted pieces can completely come together or partially come together based on pipe diameters. Since the four pieces are identical, they are interchangeable, resolving the problem of trying to figure out which parts or pieces will fit together. The height of each semicircular piece, in one embodiment, is between about 2 and about 10 inches tall, though other heights are contemplated. In one embodiment, it is between about 5 and 7 inches tall. In yet another embodiment, the height is about 6 inches tall.

Figure 5:
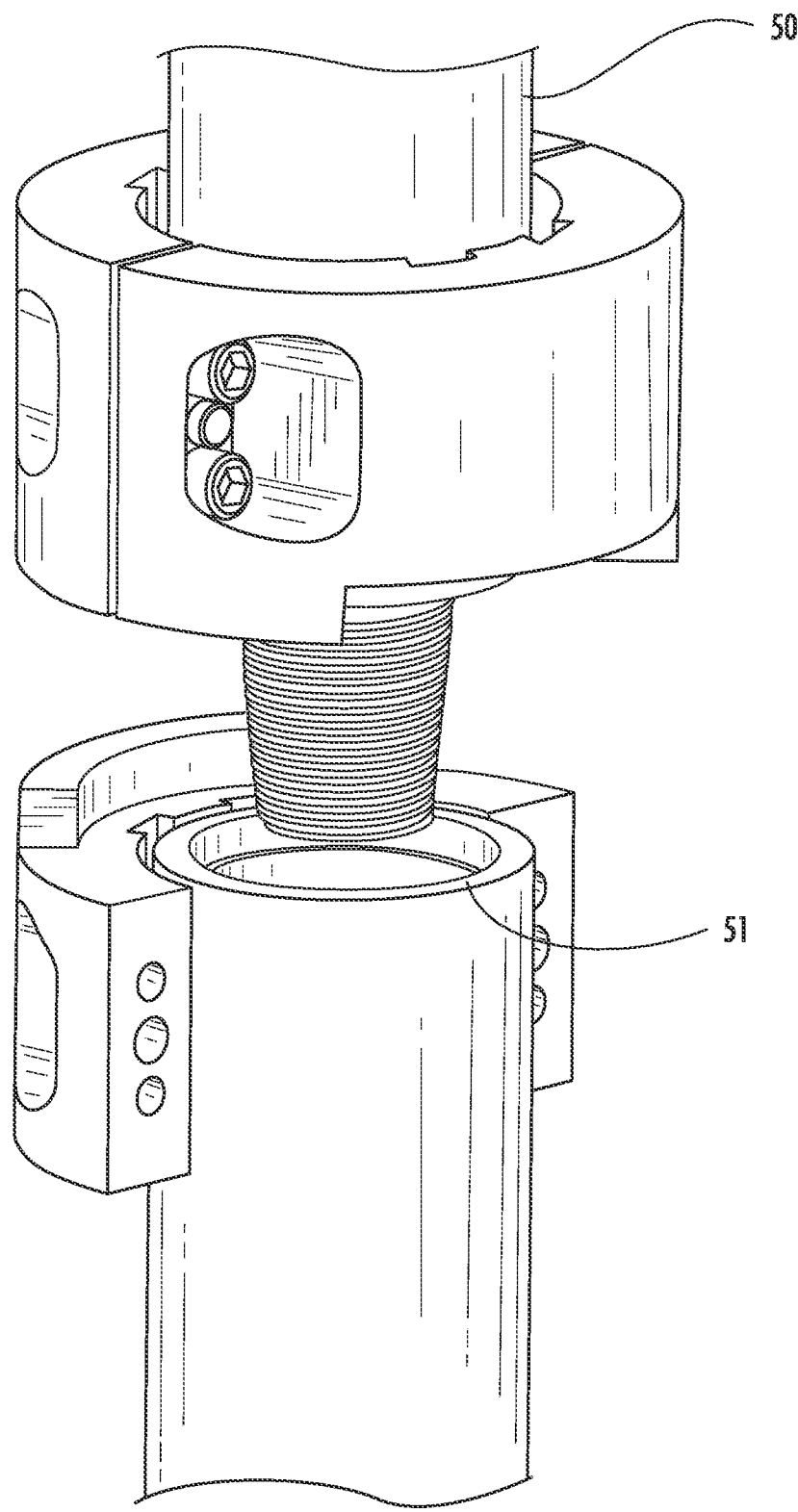
FIG. 5 is a perspective view of the four-piece clamping device (with one semicircular piece removed for viewing clarity) on a connected pipe of the present invention.

As used herein, the term "keeping connected pipe ends from loosening or separating" refers to the pipes being connected at their ends and being prevented from loosening or separating from one another (see FIG. 5 as an embodiment). This has great utility in the oil and gas industry when there is a need for two pipes to remain efficiently and securely connected.

As used herein, the term "identical" refers to each of the four pieces of the clamping device being interchangeable as the size and shape are identical. All the pieces could then be molded using the same mold or fabrication steps.

As used herein, the term "semicircular shape" refers to each of the four semicircular pieces of the clamping device designed to fit together with another semicircular piece to form a cylindrical/circular shape. Each of a first and second circular or cylindrical piece can be joined together with the other circular or cylindrical piece to achieve the clamping and connecting of the two pipe ends.

As used herein, the term "first and second circular piece" refers to each of the two semicircular pieces joined together resulting in a first and second circular piece. See the Figures for more clarity.

As used herein, the term "pipe" refers to hollow or solid tubes which are connected at their ends. The present invention keeps the connected tubes from loosening or separating. As an example, the connection of a quill is connected to a casing running tool (CRT), which transports drilling fluid (see FIG. 6).

As used herein, the term "projection" refers to a vertical raised area at the end of each of the four semicircular pieces, such that when the first and second circular pieces are formed, the projections join together so there are two projections on one side of the first and second circular devices.

As used herein, the term "two larger projections" refers to the two semicircular projection pieces being next to one another such that they form a single larger projection.

As used herein, the term "creates a depression" refers to the space between the projections being at a lower height than the projections as shown in the Figures.

As used herein, the term "height" refers to the distance between the top of the projection on one side and the bottom side of the projection.

As used herein, the term "fit together by the projections" refers to placement of the first and second circular pieces, such that the projections of one fit into the depression of the other and vice versa when clamped to pipe ends, as shown in the Figures.

As used herein, the term "joining two pipes of different diameters" refers to the pipes being joined together having diameters at the ends being of different diameters. This has great utility in the oil and gas pipe industry when there is a need to be efficiently connected.

DRAWINGS

Now referring to the drawings, FIG. 1 is a perspective view of a pair of semicircular pieces of the four-piece clamp of the present invention. Each semicircular piece 1 has four bolt holes 2 which will line up, such that bolts can be inserted to join the two semicircular pieces together fully or partially. There is shown an optional raised area 3 to aid in gripping the pipe to which it will be attached. Each end 5a and 5b has projection 7 which will create a larger projection when the two semicircular pieces are joined together.

Figure 2A:
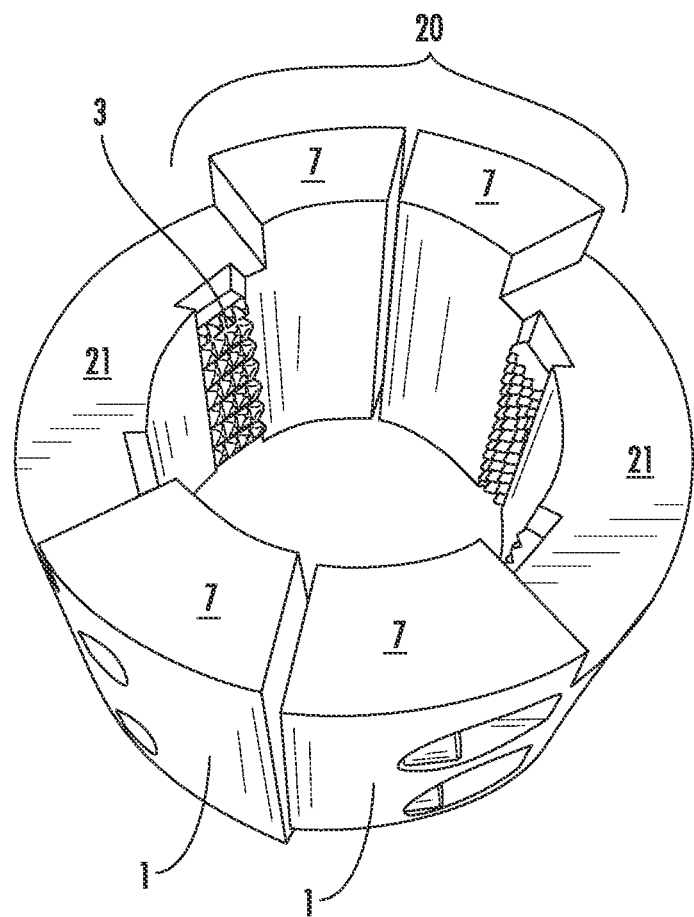
FIGS. 2a and 2b are perspective views of the two semicircular pieces of FIG. 1 aligned for bolting together of the present invention.
Figure 2B:
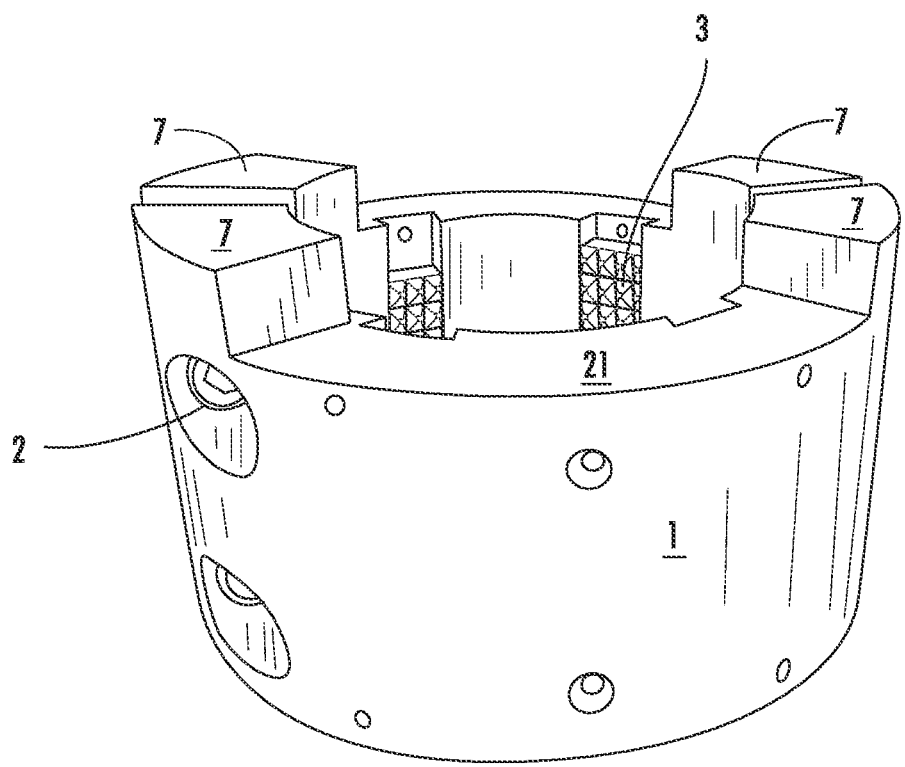

FIGS. 2a and 2b are perspective views showing a pair of semicircular pieces 1 of the four piece clamp lined up for bolting together. In these views, one can see the projections 7 lined up together to form two larger projections 20, wherein there are depressions 21 between each of the larger projections 20.

Figure 3:
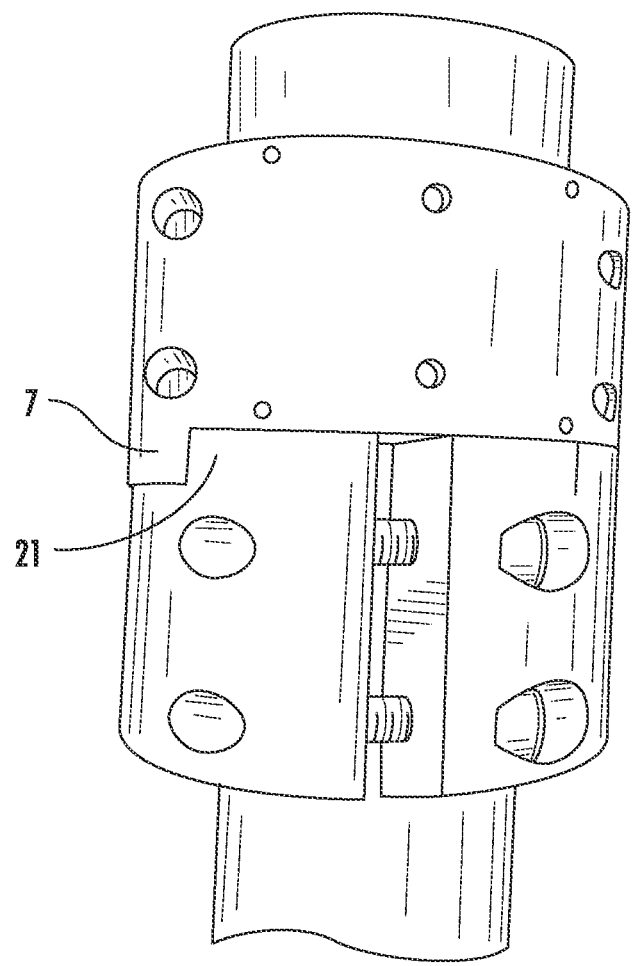
FIG. 3 is a perspective view of the four-piece clamping device bolted together and mounted to join two pipe ends of the present invention.

FIG. 3 is a perspective view showing a first and second circular piece of the present invention fit together via the projection 7 and the depression 21.

Figure 4:
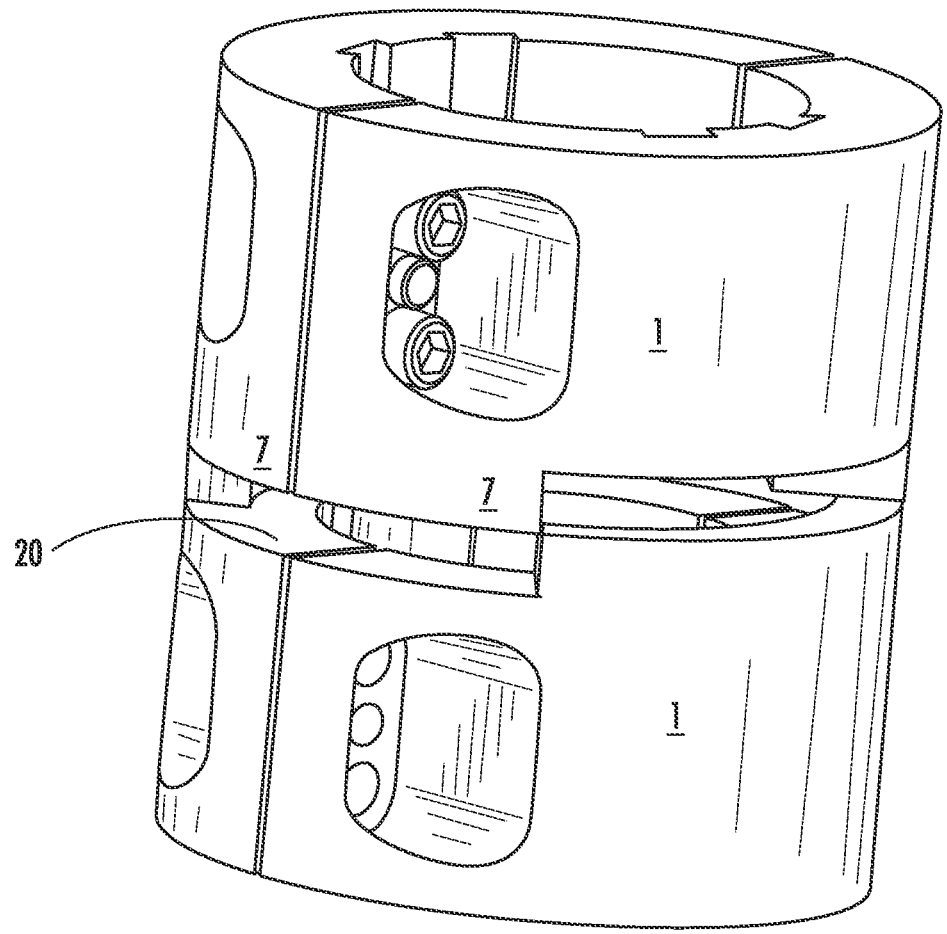
FIG. 4 is a perspective view of the present invention showing two semicircular pieces bolted together and aligned for joining together.

FIG. 4 is a perspective view of the first and second circular pieces joining, wherein projections 7 of the first circular piece are connected together forming one large projection and are connecting/interlocking with the second circular piece in depression 20.

FIG. 5 is a perspective view of the four-piece clamping device with pipe 50 having two semicircular clamps (one semicircular clamp removed for viewing clarity on pipe 51) bolted together and screwed onto pipe 50.

Figure 6:
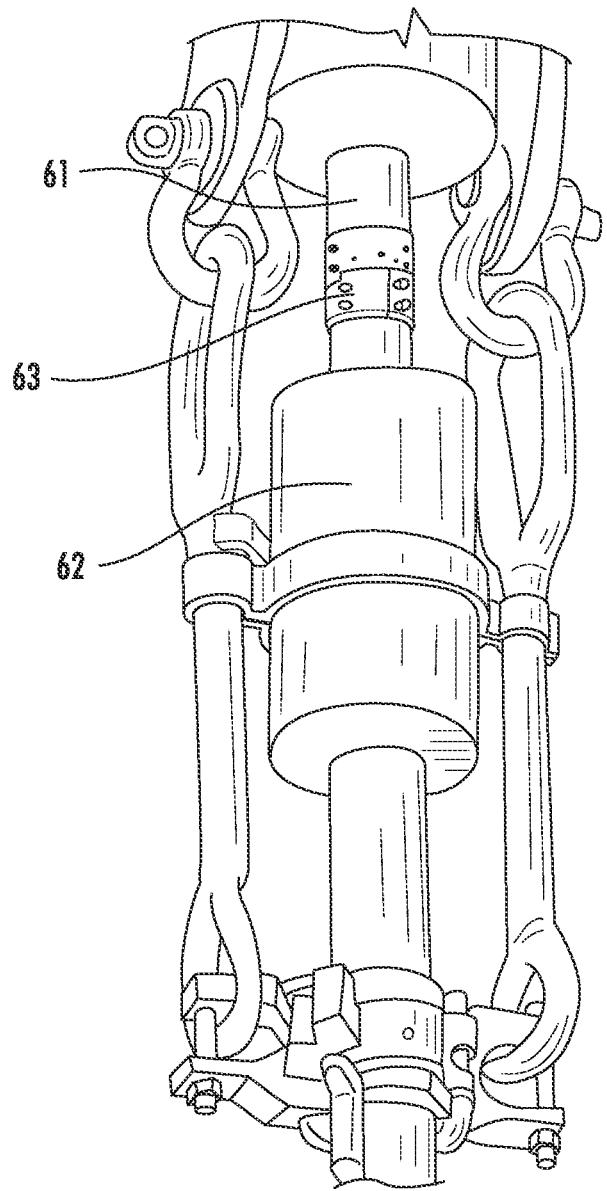
FIG. 6 is a perspective view of the present invention showing a drilling fluid quill screwed together with a casing running tool keeping the two from loosening or separating.

FIG. 6 is a perspective view of a drilling fluid quill 61 screwed together with a CRT 62 and the present invention four-piece clamp 63 keeping the drilling fluid quill 61 and the CRT 62 from loosening or separating.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A four-piece clamping device for keeping connected pipe ends from loosening or separating comprising:
   a) a set of a first and second semicircular clamp pieces that when joined together by bolts creates a first and second circular clamp piece, wherein a first and second circular clamp creates a four-piece clamping device;
   b) wherein each of the four-piece clamps are identical and comprise a semicircular shape, wherein each set of two semicircular clamps bolt together with four bolts to produce a first and second circular clamp piece;
   c) wherein each semicircular clamp piece has a projection on each end of the semicircular clamp piece, such that when two semicircular clamp pieces are bolted together to form a circular clamp piece, the projections of each semicircular clamp piece meet to form two larger projections which creates a depression between the two larger projections; and
   d) wherein the first and second circular clamp pieces fit together by the projections of the first circular clamp piece fitting into the depression of the second circular clamp piece, and the projections of the second circular clamp piece fitting into the depression of the first circular clamp piece to form a single pipe clamp.

* * * * *